United States Patent [19]

Lequeux

[11] 4,118,855
[45] Oct. 10, 1978

[54] METHOD OF INTERCONNECTING TWO MEMBERS

[75] Inventor: Christian Lequeux, Metz, France

[73] Assignee: Union Financiere et Industrielle S.A., Liege, Belgium

[21] Appl. No.: 698,645

[22] Filed: Jun. 22, 1976

[30] Foreign Application Priority Data

Jun. 23, 1975 [FR] France .................. 75 19585

[51] Int. Cl.² ............................................. B23P 11/02
[52] U.S. Cl. ...................................... 29/447; 29/512; 29/526 R; 85/37; 52/787; 108/51.1; 151/41.74
[58] Field of Search ................ 29/447, 446, 512, 526; 85/37; 151/41.72, 41.74; 52/617; 108/51.1, 56.1

[56] References Cited

U.S. PATENT DOCUMENTS

| | | | |
|---|---|---|---|
| 1,636,057 | 7/1927 | Jones | 29/447 UX |
| 1,839,850 | 1/1932 | Hodgkinson | 29/447 UX |
| 2,290,619 | 7/1942 | Rieger | 29/512 |
| 2,463,214 | 3/1949 | Stoner | 108/51.1 |
| 2,852,652 | 9/1958 | Rose et al. | 29/447 X |
| 2,930,560 | 3/1960 | Carnwath et al. | 108/56.1 |
| 2,967,593 | 1/1961 | Cushman | 29/526 UX |
| 3,252,493 | 5/1966 | Smith | 52/617 X |

Primary Examiner—Charlie T. Moon
Attorney, Agent, or Firm—Beveridge, DeGrandi, Kline & Lunsford

[57] ABSTRACT

Two planar members or two members having planar parts are interconnected using one or more assembly tubes which extend between the two members in an aperture in each member and are normal to a planar part of each member. Each end of the assembly tube is clamped against the respective external face of each member thereby providing the interconnection. A bracer tube encircles each assembly tube between the respective planar parts. As a result an assembly is obtained in which planar parts of the members are in parallel spaced apart relationship with respect to each other.

5 Claims, 7 Drawing Figures

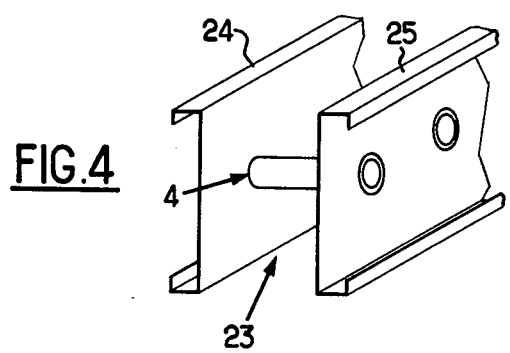
FIG.4
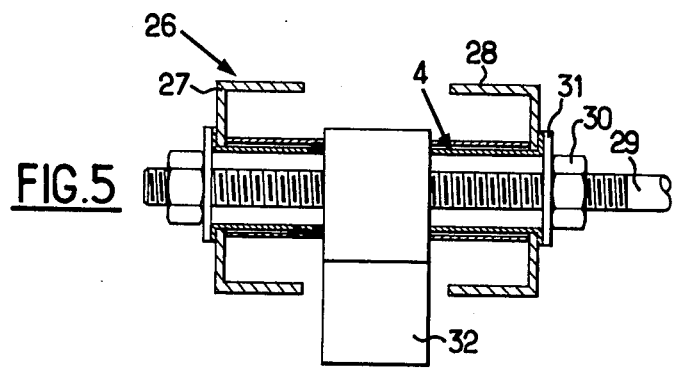
FIG.5
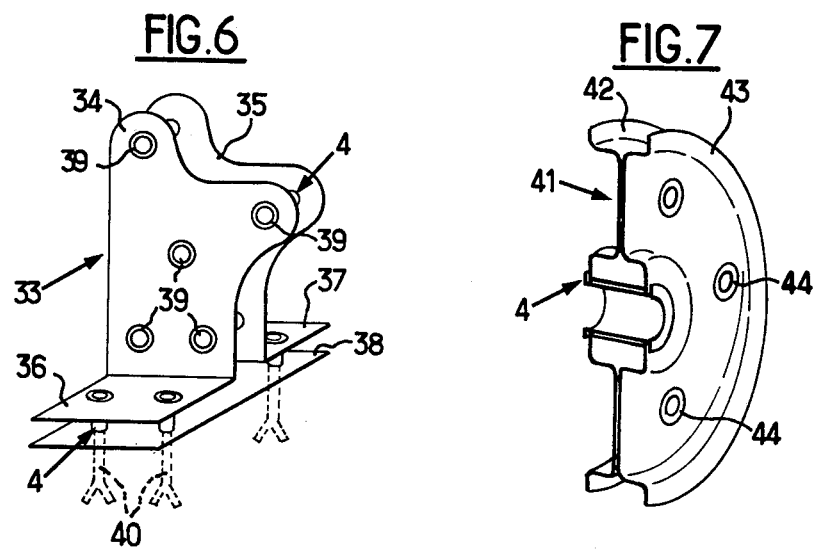
FIG.6
FIG.7

METHOD OF INTERCONNECTING TWO MEMBERS

BACKGROUND OF THE INVENTION

1. Field of the Invention

This invention relates to a method of interconnecting two members and to an assembly comprising two interconnected members, the planar members or the planar parts of the members being in parallel spaced apart relationship with respect to each other. The method and assembly can have various applications.

2. Description of the Prior Art

Welding is at present the commonest procedure for providing a permanent assembly comprising two planar metal members or items, for example two sheet metal blanks, in parallel spaced-apart relationship with respect to each other. Normally cross-members or bracing members, which can be of a variety of forms, are welded between the two members to be assembled. Such a procedure is not only expensive but can cause stress and distortion in the members when assembled.

Another alternative is to use screws or screw-threaded rods which engage in apertures in the two items or members and which are used in combination either with tubular cross-members or bracing members, which are disposed between the two items to be assembled and have the screws or rods extending therethrough or with nuts which are secured to the screws or rods on either side of the two items. In the former, the cost of the items required for assembly are, as in the previous case, fairly high, as is also the case when rivets are used instead of screws or screw-threaded rods in combination with the tubular cross-members.

Also, the diameters of the screws, threaded rods and rivets depend upon the dimensions, and in particular the thickness, of the items to be assembled, so that narrow screws or rods or rivets have to be used for sheet metal parts. Consequently, tubular cross-members or bracing members through which the screws or threaded rods or rivets extend are also of reduced diameter. The resulting system is of reduced strength, particularly as regards its ability to prevent a pivoting or tilting movement of one of the assembled items relative to the other. To provide a strong connection of this kind between two items which extend appreciably along two axes, a number of screws or rods or rivets must be distributed over the area of items — that is, a large number of assemblies must be provided. For instance, to assemble two elongate section members, for example of channel section, in spaced-apart relationship with respect to one another to form a composite beam, by way of their webs at least two longitudinal rows of screws or rods or rivets are necessary if the beam is to be of adequate strength.

SUMMARY OF THE INVENTION

It is an object of the present invention to provide a process for assembling two planar metal members, for example sheet-metal blanks, in parallel spaced-apart relationship, such that a rigid connection can be provided at low cost between the two members with the use of only a reduced number of assemblies.

This is achieved by extending at least one assembly tube between the two members through an aperture in each member, the or each assembly tube being normal to a planar part of each member, and clamping each end of the or each assembly tube against the respective external faces of each member, a bracer tube encircling the assembly tube between the respective planar parts, whereby an assembly is obtained in which planar parts of the members are in parallel spaced apart relationship with respect to each other.

The two members can be formed with circular apertures that pairs of apertures in the two members are coaxial of one another. A bracing tube is placed between the two members near each pair of coaxial apertures. An assembly tube is introduced into the apertures by way of the bracing tube. Finally, the two members are clamped against the two ends of the bracing tube to form at the two ends of the assembly tube flanges applied to the external surface of the two assembled members.

Preferably, assembly tubes having a first external right-angled flange at one of their ends are placed vertically on a support by way of the end thus flanged. A first member pierced with circular apertures is engaged on the assembly tubes so that the edge of the apertures in the first member is borne by the first flanges of the assembly tubes. A bracing tube is engaged on each assembly tube above the first member to apply the bottom edge of the bracing tubes to the edge of the apertures in the first member. The second member also pierced with circular apertures is engaged over the assembly tubes and above the bracing tubes to apply the edge of the apertures in the second member to the top end of the bracing tubes. Finally, the second flange is formed by bending the other end of the assembly tubes at right-angles.

Advantageously, to form the second flange the second projecting end of the assembly tubes is first expanded to form a 45° flange by a pressure applied to such end along the axis of the assembly tubes through the agency of a trunco-conical punch, to bring the second flange into contact with the periphery of the apertures in the second member, whereafter the second flange of the assembly tubes is bent outwardly at right-angles by a pressure applied along the axis of the assembly tubes by means of a flat punch or ram to apply the second flange flat to the edge of the apertures in the second member and clamp the two members and the intermediate bracing tubes between the two right-angled flanges of the assembly tubes.

Preferably, the assembly tubes are heated over all or some of their length beforehand and the second flange at the projecting edge of the tubes is hot shaped first to 45° and then to 90° so that during subsequent cooling the assembly experiences prestressing because of the contraction of the assembly tubes.

A description will now be given in greater detail, with reference to the accompanying drawings, of the method of assembly according to the invention and of various uses thereof.

DETAILED DESCRIPTION OF THE PREFERRED EMBODIMENTS

Figure 1:
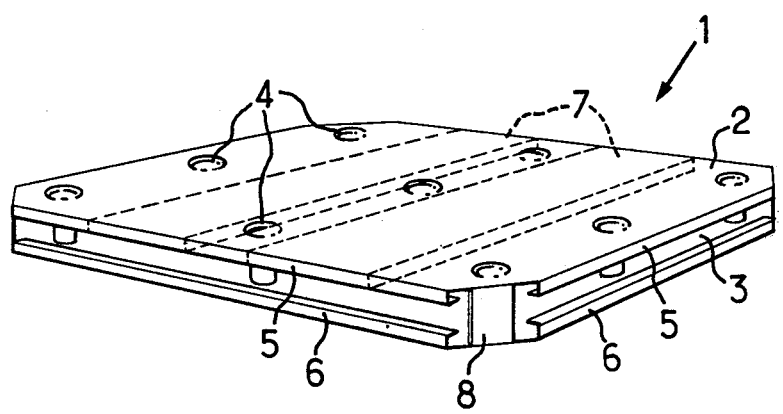
FIG. 1 shows a first embodiment of the present invention being a metal pallet.
Figure 2:
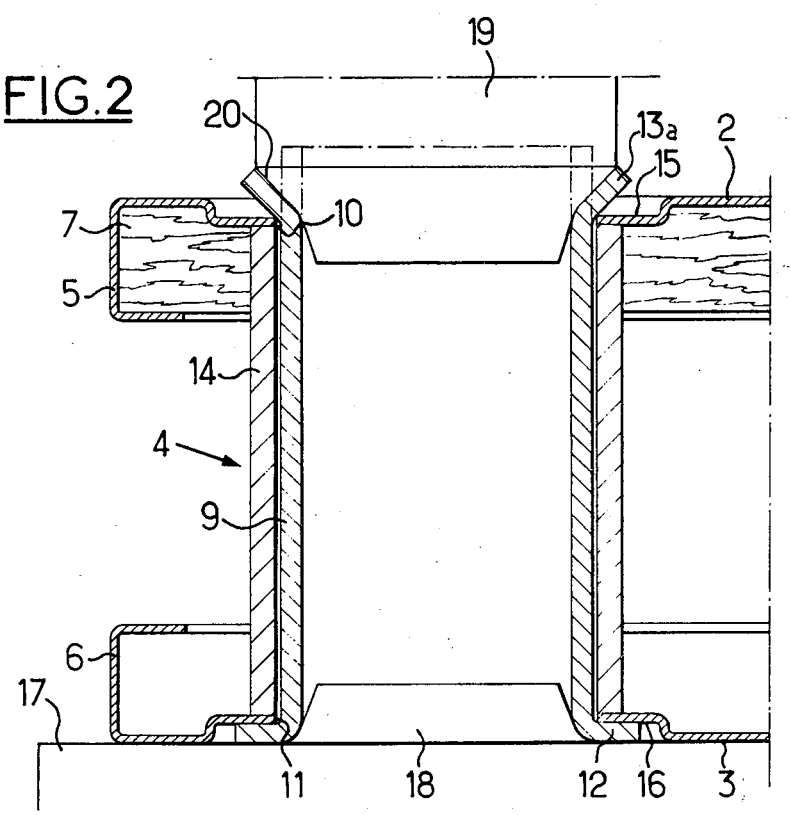
FIGS. 2 and 3 show part-sectional to views on an enlarged scale of the two phases or stages of forming the flange at the free end of an assembly tube when forming the pallet of FIG. 1, and FIGS. 4 to 7 show various other embodiments of the assembly and method according to the invention.
Figure 3:
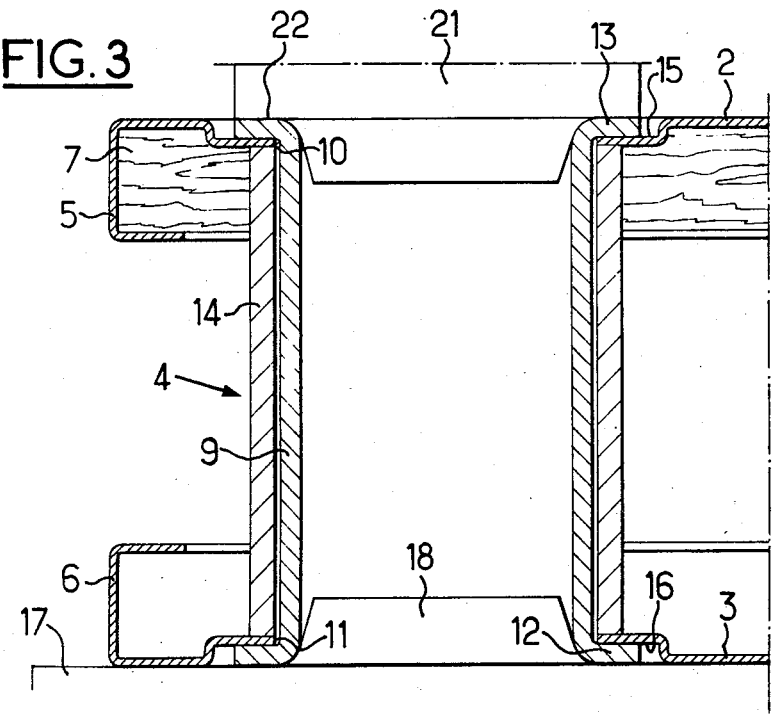

Referring first to FIGS. 1 to 3, a first embodiment, in this case an unwelded metal pallet 1, as shown in FIG. 1, and comprises two square or rectangular sheet-metal plates 2, 3 which are assembled and retained in spaced-apart relationship with respect to one another, one being situate above the other, through the agency of nine assemblies 4. The assemblies 4, which will be described in greater detail hereinafter, are distributed regularly over the superficial area of the plates 2, 3 in three rows each comprising three assemblies. Edges 5, 6 of the plates 2, 3 are bent inwardly and two opposite edges 5 of the plate engage round the ends of two timber boards or the like 7 which help to increase the rigidity of the pallet.

Also, the corners of the plates 2, 3 are bevelled at 45° and at each corner the two plates 2, 3 are interconnected by a welded metal plate 8 which strengthens the plates 2, 3 in the corner regions and facilitates engagement of the corners with feet of lifting tackle which can be lowered to engage with the corners and can be fitted to the pallet when it is required to form a pallet box.

Referring to FIG. 3, the finished assembly 4 comprises an assembly tube 9 extending with slight clearance through two coaxial apertures 10, 11, of the same diameter as one another, in the plates 2, 3 and having at its ends outside annular flanges 12, 13 clamping between them the two plates 2, 3 near the edges of the apertures 10, 11, plus a cross-tube or bracing tube 14 whose internal diameter is substantially equal to or slightly greater than the diameter of the apertures 10, 11, the tube 14 serving to maintain the plates 2, 3 in spaced-apart relationship to one another. Near the flanges 12, 13 each plate 2, 3 has an annular dished part 15, 16, the dishing extending towards the respective opposite plate 3 or 2; the depth of the dished parts 15, 16 is substantially equal to the thickness of the flanges 12, 13 and the internal diameter of the dished parts 15, 16 is slightly greater than the outside diameter of the flanges 12, 13. The pallet is assembled in the following manner.

The assembly tubes 9, one end of which has previously been shaped into a flange 12 whereas the other end is straight as shown by chain-dotted lines in FIG. 2, is placed vertically by way of the flange 12 on a press mount 17 which preferably has centring means 18 for each tube 9. The bottom plate 3 is so engaged on the positioned tubes 9 that the dished parts 16 bear on the flanges 12 near the edges of the apertures 11. A cross-tube or bracing tube 14 is then threaded on each of the assembly tubes 9 above the plate 3 and bears on the edge of the apertures 11 therein. Above the tubes 14, the top plate 2 is threaded on to the assembly tubes 9; the dished parts 15 of the top plate 2 bear near the edge of the apertures 10 on the top end of the bracing tubes 14.

Once the various constituent parts of the pallet have been connected together in the manner described, the free end of assembly tube 9, such end opening at the top on to the top plate 2, is first widened or expanded by means of a press punch or ram 19 which has a trunco-conical pressing surface 20 and which changes the shape of the assembly tube end into an annular trunco-conical external flange 13a whose generatrix makes an angle of approximately 45° with the axis of the assembly tube 9. The pressure applied by the ram 19 is such that, substantially the region of the rounded zone where it merges with the remainder of the tube 9, the flange 13a bears on the edge of the aperture 10 in plate 2, so that the tubes 9, 14 and the plates 2, 3 stay located in position relative to one another.

Thereafter, and as shown in FIG. 3, the trunco-conical flange 13a is deformed by means of a second press ram or punch 21 having a flat annular shaping surface 22, that is the flange 13a is deformed perpendicularly to the axis of the tube 9, so that the flange 13a adopts the same shape as the flange 13, that is the flange becomes a flat flange which extends at right-angles to the axis of the assembly tube 9 and so that the flange 13 just devised bears flat on the bottom of the dished part 16 above the top end of the cross-tube 14. The two flanges 12, 13 of the assembly tube 9, therefore, clamp the two plates 2, 3 against the intermediate cross-tube or bracing tube 14.

Preferably, the assembly tube 9 is heated before being placed on the press mount 17 for two reasons. In the first place, the metal deforms better when hot and hot deformation entails no risk of tearing the metal. In the second place, most metals expand when heated and contract when cooled; consequently, if the flange 13 of the tube 9 is shaped while the same is hot, the shrinkage of the tube 9 as it cools porduces in it tensile stresses directed oppositely to the stresses arising from loading of the pallet. Consequently, if the assembly prestressing is chosen appropriately, the prestressing of the assembly tube 9 can provide at least some compensation for the stresses arising from loading of the pallet, so that the same is virtually in its normal state when under load.

The pallets, therefore, have a much longer working life and can carry much heavier loads than pallets not having such prestressing when in their normal state.

On the other hand, the assembly prestressing and the load stress are additive in the bracing tube 14 and so the same must be thicker than the assembly tube 9 so that the tube 14 may readily withstand the cumulative stressing.

By way of example, it has been found advantageous in the manufacture of steel pallets to use unwelded normalized steel tubes for both the assembly tubes 19 and the bracing tubes 14, with only one difference. For instance, the tube 9 can be a piece of tube 48.3 mm in external diameter and 3.25 mm in thickness whereas the tube 14 can be a piece of tube 60.3 mm in external diameter and 3.65 mm in thickness. Advantageously, the tube 9 is heated to a temperature of from 700° to 800° C. before being placed on the press mount; the 45° shaping of the flange (FIG. 2) is carried out with a force at the ram 19 of from 45 to 80 metric tons, whereas the 90° shaping of the flange (FIG. 3) is given with a force of the ram 21 of from 30 to 35 metric tons.

Since the bracing tubes are of cylindrical shape, the forks of handling vehicles are very unlikely to cause direct impact on such tubes sufficient to damage the pallet; most of such impacts being tangential and, therefore, have virtually no effect on the strength of the pallet. In any case, the assembly tubes are virtually inaccessible since they are surrounded and protected by the bracing tubes.

However, should a pallet have to be repaired, for example because a load has dropped on it, all that is necessary is to remove one of the flanges of one or more assembly tubes 9, for example by means of an appropriate tool fitted to a drill or the like, straighten the or each deformed plate 2, 3 in a press, replace any damage bracing tubes 14, and then fit new assembly tubes 9 and bend their free ends to form flanges in the manner hereinbefore described.

The pallets can be made of any suitable ferrous or non-ferrous metals, for example aluminium and aluminium alloy, which is a very useful feature for the oil and explosive industries.

Although a pallet having two metal plates, at least one of which has internal timber planks or boards or the like 7, is shown in the drawings and described herein the scope of the invention will not be exceeded by assembling in the same way pallets comprising for example a top sheet-metal plate and three bottom sheet-metal skid or shoe carriers having wooden shoes. Also, if the edges 5, 6 of the plates 2, 3 are bent so as to terminate level with the inside surface of the plates and if the material thereof is a sheet metal of sufficient thickness, no reinforcement of any kind is needed, in other words an all-metal pallet can be provided.

The pallet in this preferred embodiment is square or rectangular. However, it can have any other shape, for example a circular shape, depending on the shape of the products to be carried.

FIG. 4 shows how the assembly method according to the invention can be used in the formation of a composite beam 23. The same is devised from two channel-section members 24, 25 which are made for example of sheet metal and which are assembled by way of their vertical webs so that the same are maintained in parallel spaced-apart relationship to one another by tubular assemblies 4. The assemblies 4 are arranged in a single row and provide adequate rigidity for the composite beam when the same experiences bending stresses in the vertical plane. The cross-section and weight of such a composite beam are appreciably less than for a section member of the same section modulus. Also, the apertures for the assemblies 4 can be used for example for mounting in the case of metal frames, and for assembly with other elements.

Referring to FIG. 5, an upright 26 is devised from two channel section members 27, 28 assembled together by way of their webs in parallel spaced-apart relationship, their arms facing one another. Such an upright can form part for example of a shelving system, the tubular assemblies 4 which are provided at different heights along the upright being adapted to receive screw-threaded rods or tiebolts or the like 29 whose threaded ends are adapted to receive nuts 30 associated with washers 31. The uprights can, therefore, be interconnected by way of the tubular assemblies 4 which can also be used to carry bracket-like support members 32 for shelf elements, the supports 32 engaging between the opposite arms of the two members 27, 28.

FIG. 6 shows how the invention is of use for a frame 33 embodied by two vertical sheet-metal blanks 34, 35 each having a horizontal arm 36, 37. The two members 34, 35 are assembled in parallel spaced-apart relationship to one another by tubular assemblies 4. The arms 36, 37 are assembled to a horizontal plate 38 by means of tubular assemblies 4. The tubular assemblies 4 of such a frame, which is embodied in the prior art by mechanical welding, can serve simultaneously to receive spindles or the like and as fixing holes for fixing bolts or the like 40 shown in chain lines.

FIG. 7 shows how the invention can be used in the construction of a sheet metal wheel or pulley 41. The same is devised from two sheet metal stampings 42, 43 which are assembled together in the disc part of the subsequent wheel or pulley by tubular assemblies 44 not having bracing tubes and near the hub by one tubular assembly 4 having a bracing tube. Advantageously, the assembly tube can be lightly bored economically for assembly of the pulley on its spindle or shaft, over-thicknesses being greatly reduced.

Clearly, the embodiments of the assembly method according to the invention which have been described and shown have been given only as non-limitative examples, for in many other uses, such as the manufacture of prefabricated metal floors, sandwich insulating panels, ladders and metal stairs, the method according to the invention provides appreciable advantages, for example by reducing weight, obviating welding stresses, obviating the need for annealing to eliminate welding stresses, facilitating automatic manufacture while permitting high flexibility because of the simplicity with which the method can be used on standard machines (small and medium series). The method can also be used for articles which have already been treated by for example being galvanized, varnished, painted or the like.

Depending upon the amount of prestressing to be given at assembly, the assembly tube can be heated either just over a reduced part of its length near the second flange or over a fairly substantial proportion of its length or even over its whole length, the intensity of prestressing being directly proportional to the tube length heated. The heating temperature is at most equal to the first transformation point of the metal used for the assembly tubes.

Bracing tubes and/or assembly tubes, particularly short ones, can also be produced by stamping circular sheet-metal blanks pierced with a central aperture.

I claim:

1. A method of interconnecting two members each having a planar part, comprising the steps of forming at least one circular aperture in the planar part of each member, placing an unflanged bracing tube between the planar parts of the two members coaxially with each pair of respective apertures, introducing an assembly tube through each bracing tube into each pair of respective apertures, each assembly tube having a first external right-angled flange at one end thereof, heating each assembly tube over all or part of the length thereof, hot-shaping a second flange at the projecting end of each assembly tube first to about 45° and then to about 90°, and cooling the assembly tube to prestress it due to contraction thereof, whereby an assembly is obtained in which planar parts of the members are in parallel spaced apart relationship with respect to each other.

2. The method of claim 1, performed by using assembly tubes which are standard unwelded steel tubes having an outside diameter of approximately 48 mm and a thickness of approximately 3.25 mm, using bracing tubes which are standard unwelded steel tubes having an outside diameter of approximately 60 mm and a thickness of approximately 3.65 mm, heating the assembly tubes to a temperature of from 700° to 800° C., and shaping the second flange to 45° by applying a punch or ram force of from 45 to 80 metric tons, and shaping the second flange to right-angles by applying a punch or ram force of from approximately 30 to 35 metric tons.

3. A method of interconnecting two members each having a planar part, which method comprises, placing assembly tubes, each of which tubes has a first external right-angled flange at one end thereof, vertically on a support on the flange, engaging a first member having circular apertures on the assembly tubes such that the edge of the apertures of the first member is borne by the first flanges of the assembly tubes, positioning an unflanged bracing tube over each assembly tube above the first member so as to apply the bottom edge of each bracing tube to the edge of each aperture in the first member, positioning a second member having circular apertures over the assembly tubes and above the bracing tubes so as to apply the edge of the apertures in the second member to the top end of the bracing tubes, and bending the second projecting end of the assembly tubes outwardly at right-angles while the assembly tube is in a heated condition to form a second flange in contact with the periphery of the apertures in the second member, whereby an assembly is obtained in which planar parts of the members are in parallel spaced apart relationship with respect to each other.

4. The method of claim 3, wherein the second flange is formed by bending the second projecting end of the assembly tubes to 45° by a pressure applied to the end along the axis of the assembly tubes using a trunco-conical punch, thereby bringing the second flange into contact with the periphery of the apertures in the second member, whereafter the second flange of the assembly tubes is bent outwardly at right-angles by a pressure applied along the axis of the assembly tubes using a flat punch or ram to apply each second flange flat against the edge of the apertures in the second member and to clamp the two members and the bracing tubes between the two right-angled flanges of the assembly tubes.

5. The method of claim 4, performed by using assembly tubes which are standard unwelded steel tubes having an outside diameter of approximately 48 mm and a thickness of approximately 3.25 mm, using bracing tubes which are standard unwelded steel tubes having an outside diameter of approximately 60 mm and a thickness of approximately 3.65 mm, heating the assembly tubes to a temperature of from 700° to 800° C., and shaping the second flange to 45° by applying a punch or ram force of from 45 to 80 metric tons, and shaping the second flange to right-angles by applying a punch or ram force of from approximately 30 to 35 metric tons.

* * * * *